United States Patent
Ho

(10) Patent No.: US 8,531,830 B2
(45) Date of Patent: *Sep. 10, 2013

(54) NOTEBOOK COMPUTER

(75) Inventor: Chia-Ju Ho, Taipei (TW)

(73) Assignee: Inventec Corporation (TW)

( * ) Notice: Subject to any disclaimer, the term of this patent is extended or adjusted under 35 U.S.C. 154(b) by 329 days.

This patent is subject to a terminal disclaimer.

(21) Appl. No.: 12/982,183

(22) Filed: Dec. 30, 2010

(65) Prior Publication Data

US 2012/0120597 A1 May 17, 2012

(30) Foreign Application Priority Data

Nov. 16, 2010 (TW) .............................. 99139436 A

(51) Int. Cl.
*G06F 1/16* (2006.01)
(52) U.S. Cl.
USPC ............... 361/679.55; 362/248; 365/225.7; 248/309.1
(58) Field of Classification Search
USPC ............ 362/85, 248; 361/679.09, 679.55, 361/679.21, 679.02, 679.58, 679.06, 679.33, 361/679.41, 679.43, 679.23, 801; 365/185.03, 365/185.22, 185.18, 185.29, 222, 244, 189.05, 365/225.7; 345/531, 212, 87, 690, 211, 698, 345/89, 78, 214, 100; 248/316.5, 425, 309.1; 439/352, 131; 312/223.2, 265.5
See application file for complete search history.

(56) References Cited

U.S. PATENT DOCUMENTS 5,666,261 A * 9/1997 Aguilera ............... 361/679.09
2012/0051029 A1* 3/2012 Huang et al. .................. 362/85

FOREIGN PATENT DOCUMENTS

| TW | M309705 | 4/2007 |
| TW | M314361 | 6/2007 |
| TW | M333597 | 6/2008 |

* cited by examiner

*Primary Examiner* — Hung Duong
(74) *Attorney, Agent, or Firm* — Lowe Hauptman & Ham, LLP

(57) ABSTRACT

A notebook computer comprises a first machinery, a first latch, a second machinery, a slider, a second elastic element and a push element. The second machinery has one side pivotally connected to the first machinery, and the other side formed with at least one latching hole. The slider comprises a body, a second latch and a first elastic element. The body is slidably disposed in the second machinery along a first moving path. The second latch disposed on the body latches or unlatches the first latch disposed on the first machinery. The first elastic element has one end connected to the body, and the other end pressing the first latch. The second elastic element has one end connected to the slider, and the other end connected to the second machinery. The push element, slidably disposed in the second machinery along a second moving path, pushes the first elastic element.

10 Claims, 5 Drawing Sheets

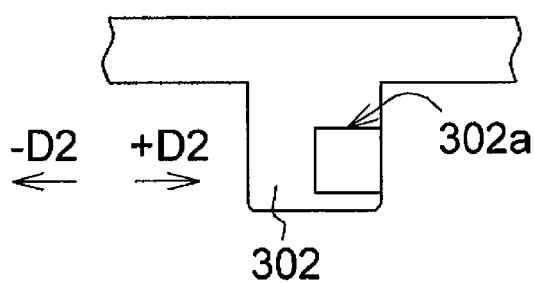
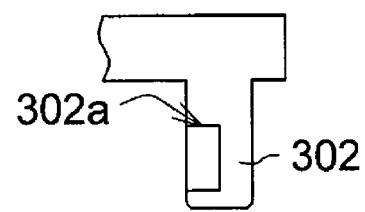
FIG. 3A  FIG. 3B
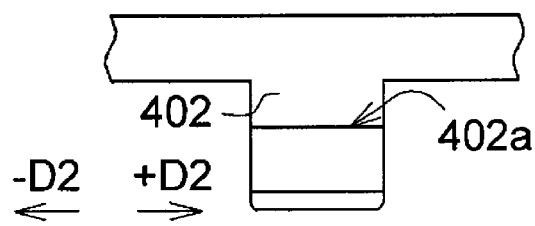
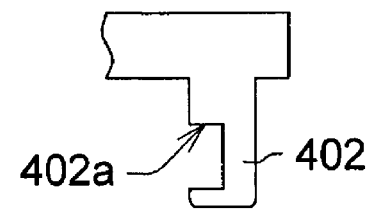
FIG. 4A  FIG. 4B

NOTEBOOK COMPUTER

This application claims the benefit of Taiwan application Serial No. 99139436, filed Nov. 16, 2010, the subject matter of which is incorporated herein by reference.

BACKGROUND OF THE INVENTION

1. Field of the Invention

The disclosure relates in general to a notebook computer, and more particularly to a cover-type notebook computer.

2. Description of the Related Art

In each of some conventional notebook computers, a latch structure is disposed between its first machinery and its second machinery, so that the first machinery cannot be easily rotated away from the second machinery when the notebook computer is being stored. In this case, the first machinery cannot be easily impacted and damaged by the ambient objects when the notebook computer is being transported. Especially in the notebook computer, a display tends to be disposed on the first machinery. Among the components constituting the display, panels each made of an ultra-thin glass sheet are even used. Thus, the notebook computer with the latch structure can prevent the display from being damaged.

However, in the conventional latch structure, the latch structure often has to be mounted in an unlatched state while the first machinery is opened. If the latch structure is released before the first machinery is opened, the latch structure recovers to the latched state such that the first machinery cannot be opened. Consequently, when the user wants to open the first machinery, he or she has to consider the state of the latch structure and concurrently open the first machinery in an inconvenient manner.

SUMMARY OF THE INVENTION

The disclosure is directed to a notebook computer having a first machinery, a second machinery and a first latch and a corresponding latching hole, which are disposed between the first machinery and the second machinery.

According to a first aspect of the present disclosure, a notebook computer is provided. The notebook computer includes a first machinery, a first latch, a second machinery, a slider, a second elastic element and a push element. The first latch is disposed on an edge of the first machinery. The second machinery has one side pivotally connected to the first machinery, and the other side formed with at least one latching hole. The slider comprises a body, a second latch and a first elastic element. The body is slidably disposed in the second machinery along a first moving path. The second latch is disposed on the body and suits to latch the first latch or unlatch an interference with the first latch. The first elastic element has one end connected to the body, and the other end suiting to press the first latch. The second elastic element has one end connected to the slider, and the other end connected to an inner wall of the second machinery. The push element is slidably disposed in the second machinery along a second moving path and suits to push the first elastic element. When the push element pushes the first elastic element, the first elastic element no longer presses the first latch, and the second elastic element acts upon the slider to unlatch the interference between the second latch and the first latch.

The above and other aspects of the disclosure will become better understood with regard to the following detailed description of the embodiment(s). The following description is made with reference to the accompanying drawings.

BRIEF DESCRIPTION OF THE DRAWINGS

FIGS. 3A and 3B are cross-sectional views showing another aspect of a first latch according to the embodiment of the disclosure.

FIGS. 4A and 4B are cross-sectional views showing still another aspect of a first latch according to the embodiment of the disclosure.

DETAILED DESCRIPTION OF THE INVENTION

Figure 1A:
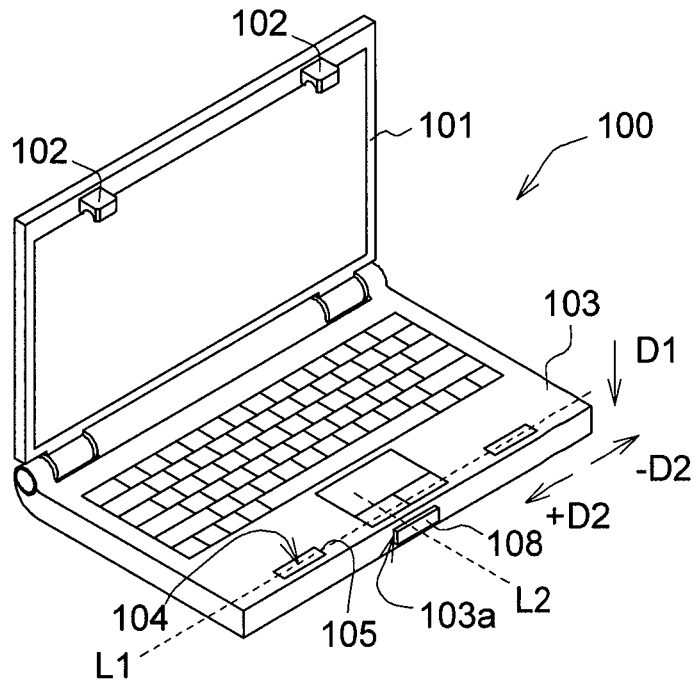
FIGS. 1A and 1B are perspective views showing a notebook computer according to an embodiment of the disclosure.
Figure 1B:
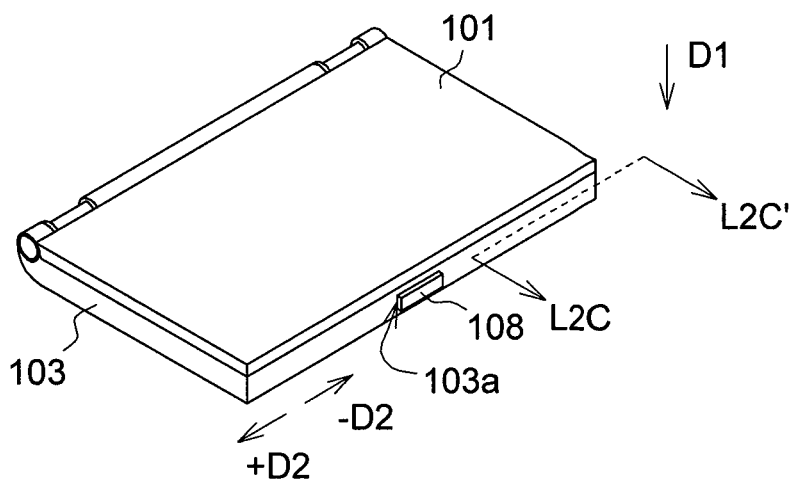

FIGS. 1A and 1B are perspective views showing a notebook computer 100 according to an embodiment of the disclosure. FIG. 1A is a perspective view showing a first machinery 101 of the notebook computer 100, which is opened. FIG. 1B is a perspective view showing the first machinery 101 of the notebook computer 100, which is closed. Referring to FIG. 1A, the notebook computer 100 includes the first machinery 101, a first latch 102, a second machinery 103, a slider 104 (to be depicted in FIG. 2C), a second elastic element 107 (to be depicted in FIG. 2C) and a push element 108. The first latch 102 is disposed on an edge of the first machinery 101. As shown in FIG. 1B, the first latch 102 latches the slider 104. The cross-sectional view taken along a line L2C-L2C' in FIG. 1B is shown in FIG. 2C. FIG. 2C is a cross-sectional side view showing the first latch 102 latching the slider 104 in the notebook computer 100 according to the embodiment of the disclosure.

As shown in FIG. 2C, the second machinery 103 has one side pivotally connected to the first machinery 101, and the other side formed with at least one latching hole 105. The latching hole 105 is disposed in correspondence with the position of the first latch 102, so that the first latch 102 is inserted into the latching hole 105 when the first machinery 101 and the second machinery 103 are closed relatively to each other. The slider 104 includes a body 104a, a second latch 104b and a first elastic element, which includes an elastic arm 104c and a stopper block 104d. The body 104a is slidably disposed in a space 106 inside the second machinery 103 along a first moving path L1. The second latch 104b is disposed on the body 104a. The second latch 104b suits to latch the first latch 102, or unlatch an interference with the first latch 102. The elastic arm 104c has a first end 104c' connected to the body 104a. The elastic arm 104c has a curved elastic recovery force and a retractable elastic recovery force. The stopper block 104d has a first side 104d' and a second side 104d". The first side 104d' of the stopper block 104d is disposed on a second end 104c" of the elastic arm 104c. The second side 104d" of the stopper block 104d faces the second latch 104b and suits to press the first latch 102. The second elastic element 107 has one end connected to the slider 104, and the other end connected to an inner wall of the second machinery 103. The push element 108 (to be depicted in FIG. 2E) is slidably disposed on the second machinery 103 along a second moving path L2, and suits to push the stopper block 104d of the first elastic element. When the push element 108 pushes the stopper block 104d, the stopper block 104d no longer presses the first latch 102, and the second elastic element 107 acts upon the slider to unlatch the interference between the second latch 104b and the first latch 102.

As shown in FIG. 2C, the first latch 102 and the first machinery 101 are integrally formed to simplify the manufacturing processes and increase the mechanical strength between the first latch 102 and the first machinery 101. The cross-sectional area of the latching hole 105 parallel to the surface of the second machinery 103 is larger than or equal to the cross-sectional area of the first latch 102 parallel to the surface of the first machinery 101, so that the first latch 102 can be inserted into the latching hole 105.

Figure 2A:
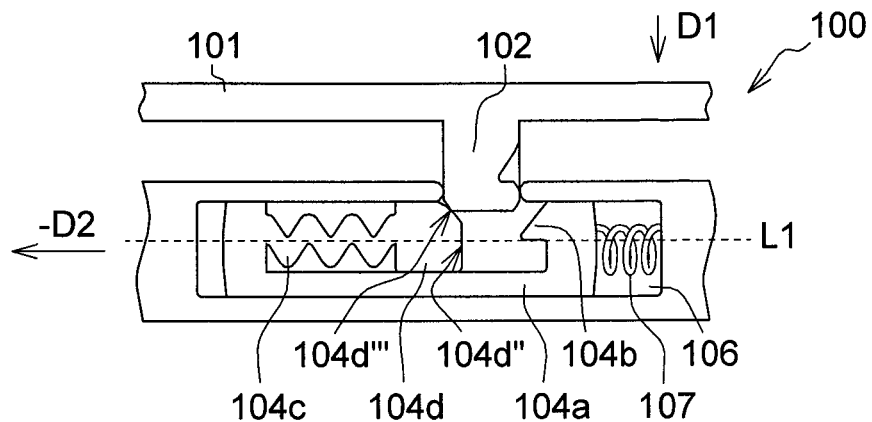
FIGS. 2A to 2E are cross-sectional views showing a latch process of a first latch and a slider according to the embodiment of the disclosure.
Figure 2B:
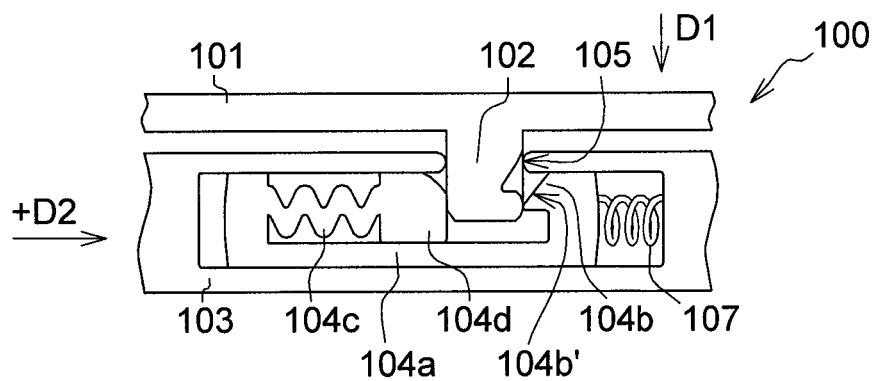
Figure 2C:
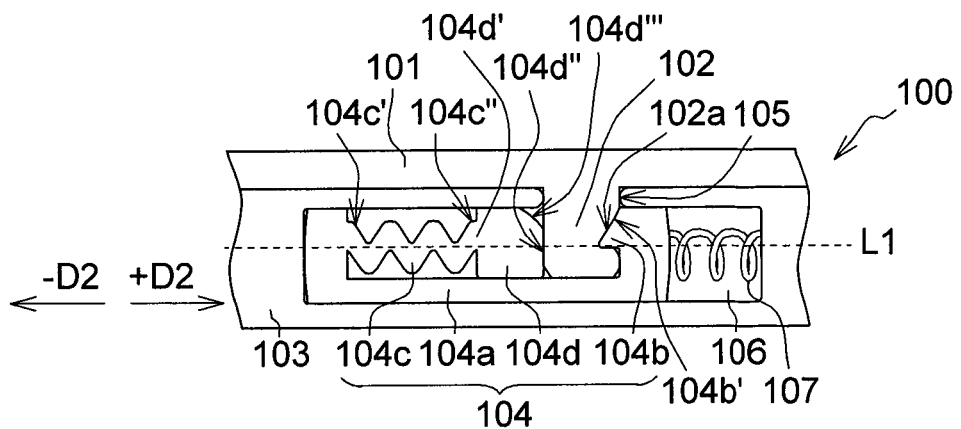
Figure 2D:
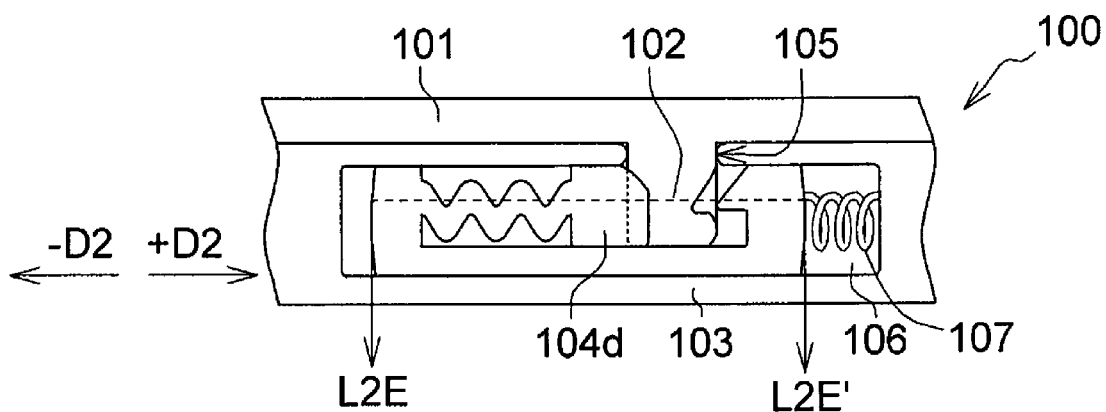
Figure 2E:
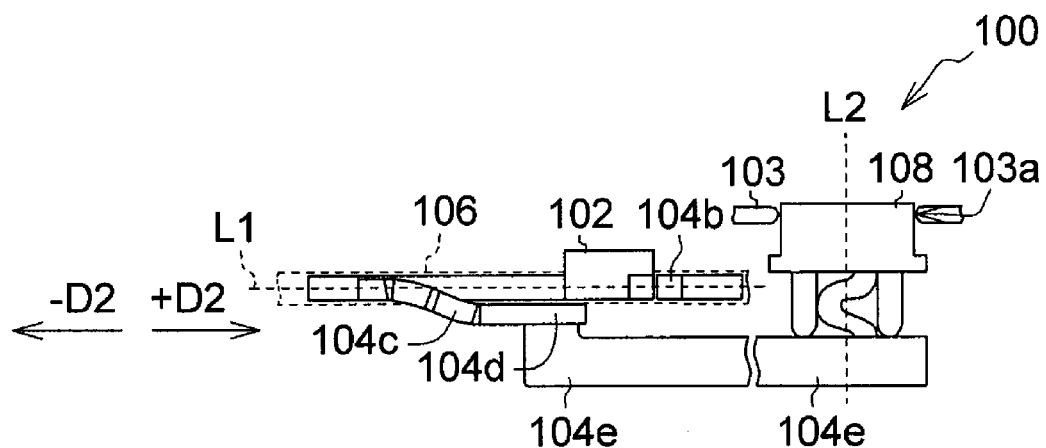
Figure 2F:
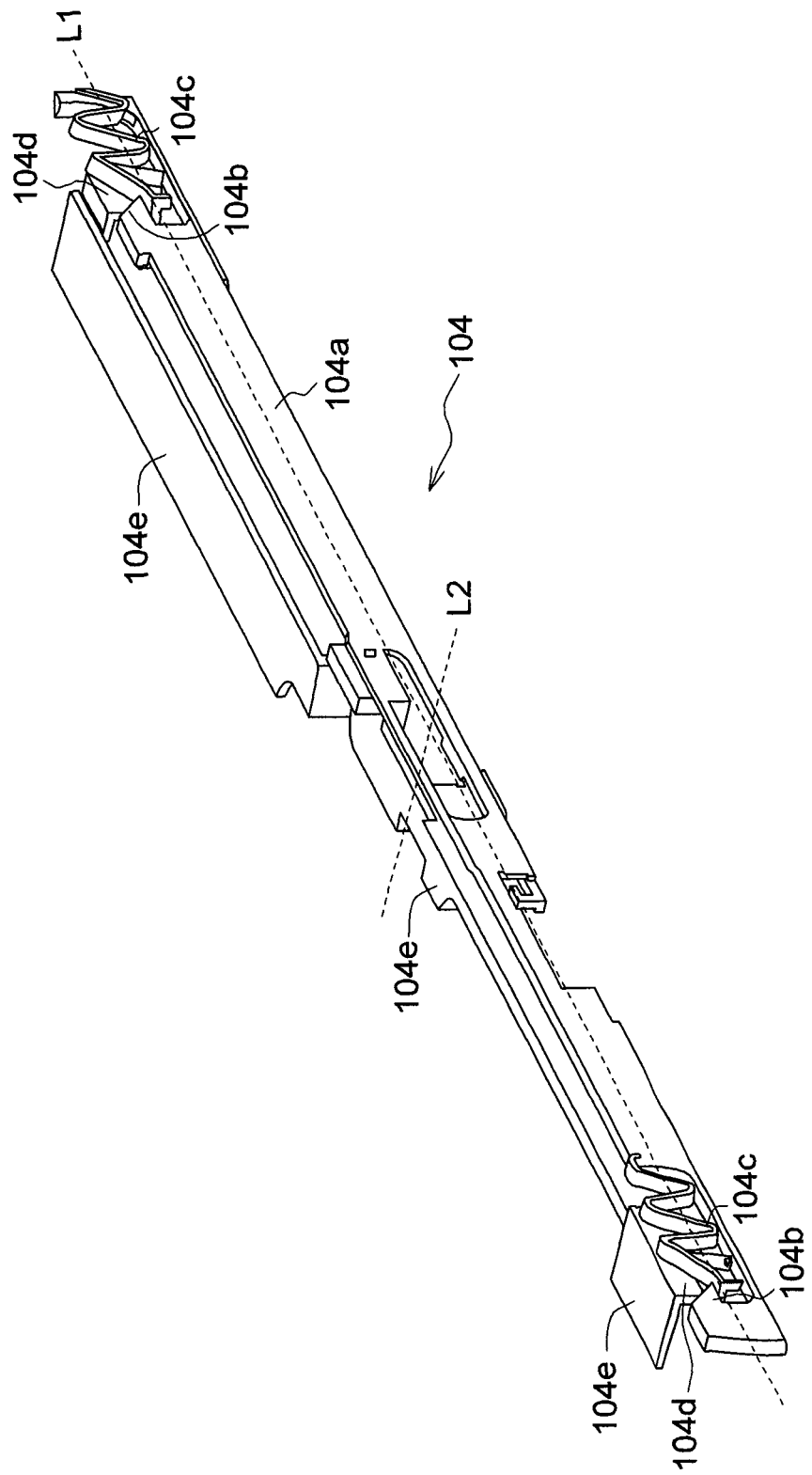
FIG. 2F is a perspective view showing the slider according to the embodiment of the disclosure.

FIG. 2F is a perspective view showing the slider 104 according to the embodiment of the disclosure. As shown in FIG. 2F, the body 104a, the second latch 104b, the elastic arm 104c and the stopper block 104d of the slider 104 are integrally formed to simplify the processes of manufacturing the slider 104. The elastic arm 104c has, for example, a wavy shape, so that the elastic arm 104c may be compressed or tensed along the first moving path L1, and thus has an elastic constant along the first moving path L1. In addition, the elastic arm 104c may also be curved, so that the stopper block 104d may slide along the first moving path L1, and may also be moved away from the first moving path L1, or elastically moved back to the first moving path L1 through the curved elastic recovery force.

As shown in FIG. 2C, one surface of the stopper block 104d facing the second latch 104b has a first inclined surface 104d'''. One surface of the second latch 104b facing the stopper block 104d has a second inclined surface 104b'. The first latch 102 suits to act upon the first inclined surface 104d''' and the second inclined surface 104b' to actuate the slider. The first latch 102 has a fastening slot 102a, which has a dimension greater than or equal to that of the stopper block 104d, so that the slider 104 latches the first latch 102.

Referring to FIG. 2C, the notebook computer 100 further includes the second elastic element 107, which is disposed in the space 106 in the second machinery 103 and connected to the body 104a of the slider 104. The elastic constant of the second elastic element 107 along the first moving path L1 is smaller than the elastic constant of the elastic arm 104c along the first moving path L1. The deformation direction of the second elastic element 107 is parallel to the first moving path L1, for example.

FIG. 2E is a cross-sectional top view showing the notebook computer 100 according to the embodiment of the disclosure. The second machinery 103 has a through hole 103a, in which the push element 108 is disposed. The slider 104 has an extension 104e, which is connected to the stopper block 104d and extends to the second moving path L2. The push element 108 rests against the extension 104e to push the extension 104e, and push the stopper block 104d outside the first moving path L1 to unlatch the interference between the second latch 104b and the first latch 102.

The latching process between the first latch 102 and the slider 104 will be illustrated with reference to FIGS. 2A to 2E.

As shown in FIG. 2A, when the first machinery 101 and the second machinery 103 have not been closed relatively to each other, the second latch 104b is located at a position away from the latching hole 105, and the position of the stopper block 104d partially overlaps with the position of the latching hole 105. The distance between the second latch 104b and the stopper block 104d is smaller than the width of the first latch 102. When the first machinery 101 and the second machinery 103 are to be closed relatively to each other, the first latch 102 is inserted into the latching hole 105 of the second machinery 103 along the D1 direction. The stopper block 104d has the first inclined surface 104d''' slantingly facing the latching hole 105. At this time, the first latch 102 suits to act upon the first inclined surface 104d''' of the stopper block 104d to deform the elastic arm 104c and the second elastic element 107 along the first moving path L1. Thus, the first latch 102 can rest against the first inclined surface 104d''' when the first latch 102 is moved in the D1 direction, so that the stopper block 104d slides in the negative direction −D2 of the first moving path L1. At this time, the stopper block 104d moves the elastic arm 104c to slide in the negative direction −D2, so that the elastic arm 104c pushes the body 104a in the negative direction −D2. The elastic arm 104c also generates a first compressive deformation state along the first moving path L1. At this time, the second elastic element 107 is slightly tensed to generate a first tensile deformation state along the first moving path L1. Because the elastic constant of the elastic arm 104c is greater than the elastic constant of the second elastic element 107, the second elastic element 107 deforms more easily than the elastic arm 104c, so that the second elastic element 107 is tensed more easily than the compression of the elastic arm 104c. Thus, the body 104a slides in the negative direction −D2 to make the second latch 104b slide also in the negative direction −D2. The second latch 104b also partially overlaps with the latching hole 105 with the slide of the body 104a. In another embodiment, the deformation of the second elastic element is the compressive deformation.

Next, as shown in FIG. 2B, the first latch 102 continuously moves in the D1 direction. The second latch 104b has the second inclined surface 104b' slantingly facing the latching hole 105 to have, for example, the shape of a triangular prism or a trapezoidal prism. Thus, it is possible to let the first latch 102 rest against the second inclined surface 104b' when the first latch 102 is continuously moved in the D1 direction, so that the second latch 104b and the body 104a slide in the positive direction +D2 of the first moving path L1, and the stopper block 104d still rests against the first latch 102. Thus, the first latch 102 is located between the second latch 104b and the stopper block 104d, and the originally tensed second elastic element 107 in FIG. 2A slightly restores. However, when the elastic arm 104c is not compressed, the distance between the second latch 104b and the stopper block 104d is smaller than the width of the first latch 102. At this time, because the first latch 102 is located between the second latch 104b and the stopper block 104d, the elastic arm 104c is compressed, the distance between the second latch 104b and the stopper block 104d is substantially equal to the width of the first latch 102.

Next, as shown in FIG. 2C, the first latch 102 further includes the fastening slot 102a. The dimension of the fastening slot 102a is greater than or equal to that of the second latch 104b, so that the second latch 104b latches the fastening slot 102a of the first latch 102. In FIG. 2B, the first machinery 101 is continuously moved toward the second machinery 103, so that the first latch 102 is continuously moved in the D1 direction. The compression of the elastic arm 104c in FIG. 2B exerts the elastic recovery force on the body 104a in the negative direction −D2. Thus, when the fastening slot 102a of the first latch 102 corresponds to the second latch 104b, as shown in FIG. 2C, the stopper block 104d presses the first latch 102 and the fastening slot 102a provides a space for the second latch 104b to move in the negative direction −D2. Thus, the elastic recovery force, stored in the previously compressed elastic arm 104c, is slightly released so that the overall body 104a is moved in the negative direction −D2, and the first latch 102 latches the second latch 104b. At this time, the elastic arm 104c is converted from the first compressive deformation state into a second compressive deformation state, and the compressive deformation extent of the first compressive deformation state is greater than that of the second compressive deformation state. At this time, the second elastic element 107 is converted from the first tensile deformation state into a second tensile deformation state, and the tensile deformation extent of the first tensile deformation state is smaller than that of the second tensile deformation state.

In detail, the elastic arm 104c recovers to reduce the compression and move the body 104a in the negative direction −D2, the second latch 104b also slides therewith toward the fastening slot 102a, and the tensed deformation of the second elastic element 107 is increased. Because the elastic constant of the elastic arm 104c is greater than that of the second elastic element 107, the deformation of the elastic arm 104c is more difficult than that of the second elastic element 107. Thus, the second latch 104b latches the fastening slot 102a of the first latch 102 so that the first machinery 101 is fixed to the second machinery 103.

When the unlatching process has to be performed, illustrations will be made with reference to FIGS. 2D and 2E. FIG. 2D is a cross-sectional side view showing the notebook computer 100 in the unlatching condition according to the embodiment of the disclosure. FIG. 2E is a cross-sectional top view taken along a line L2E-L2E' of FIG. 2D. Referring to FIG. 2E, the slider includes the extension 104e, which is connected to the stopper block 104d and extends to penetrate through the through hole 103a of the second machinery 103. The notebook computer 100 further includes the push element 108, which is disposed on the through hole 103a and rests against the extension 104e. The positional relationship between the push element 108 and the through hole 103a relative to the notebook computer 100 is shown in FIGS. 1A and 1B. In addition, as shown in FIG. 2E, the extension 104e and the stopper block 104d are integrally formed. In the unlatching process, as shown in FIG. 2E, the push element 108 is pushed to move the extension 104e, so that the second stopper block 104d is moved away from the first moving path L1, the stopper block 104d also does not rest against the first latch 102, and the elastic arm 104c is in the curved state. At this time, even if the push element 108 is no longer pushed, the stopper block 104d is still moved away from the first moving path L1. In other embodiment, the push element 108 may also directly exert a force on the stopper block 104d to move the stopper block 104d outside the first moving path L1 and thus to release the action of the stopper block 104d upon the first latch 102.

At this time, as shown in FIG. 2D, the stopper block 104d does not rest against the first latch 102 and partially overlaps with the first latch 102. In the condition that the stopper block 104d does not rest against the first latch 102, the elastic arm 104c is not compressed or tensed and thus cannot exert a force on the body 104a in the positive direction +D2 or the negative direction −D2. However, the second elastic element 107 is in the tensed state previously in FIG. 2C. So, the second elastic element exerts a force on the body 104a in the positive direction +D2, so that the body 104a and the second latch 104b connected to the body 104a slide in the positive direction +D2. Thus, the second latch 104b is moved away from the latching hole 105 to unlatch the first latch 102. At this time, even if the push element 108 is no longer pushed, the stopper block 104d is still moved away from the space 106. So, the notebook computer 100 may also in the unlatched state without continuously pushing the push element 108, so that the first machinery 101 can be opened. With such a design, the user can directly open the first machinery 101 by firstly pushing the push element 108 and then releasing the push element 108.

After the first machinery 101 is opened, as shown in FIG. 2A, the first latch 102 is also moved away from the latching hole 105 and cannot overlap with the stopper block 104d. At this time, the curved elastic recovery force of the elastic arm 104c recovers the elastic arm 104c to the non-curved state, so that the stopper block 104d recovers to the first moving path L1.

In this embodiment, as shown in FIG. 2C, the fastening slot 102a may have the shape of the triangular prism or the trapezoidal prism slightly larger than or equal to the second latch 104b. Thus, the stopper block 104d can be completely latched into the fastening slot 102a during the latching process.

FIGS. 3A and 3B are cross-sectional views showing another aspect of a first latch 302 according to the embodiment of the disclosure. FIG. 3A is a cross-sectional front view showing the first latch 302, and FIG. 3B is a cross-sectional side view showing the first latch 302. As shown in FIGS. 3A and 3B, a fastening slot 302a may have a shape of a rectangular prism encompassing (i.e., larger than) the second latch 104b.

FIGS. 4A and 4B are cross-sectional views showing still another aspect of a first latch 402 according to the embodiment of the disclosure. FIG. 4A is a cross-sectional front view showing the first latch 402, and FIG. 4B is a cross-sectional side view showing the first latch 402. As shown FIGS. 4A and 4B, a fastening slot 402a has a grooved shape capable of completely penetrating through a surface of the first latch 402. With such a design, the first latches 302 and 402 can be easily molded.

The embodiment of the disclosure is directed to a notebook computer, in which the first machinery latches the second machinery according to the first latch disposed on the first machinery and the slider disposed on the second machinery. Thus, the first machinery and the second machinery cannot easily get loose, and it is possible to prevent the first machinery from being impacted and thus to protect the fragile display disposed on the first machinery. Furthermore, the body of the slider is slidably disposed in the second machinery but not disposed in the first machinery, and the second machinery generally has the larger space than the first machinery. So, the first machinery can be thinned, so that the overall notebook computer can be thinned. In addition, with such a design, the user can directly open the first machinery with a single hand by pushing the push element to disable the latched state, and then releasing the push element.

While the disclosure has been described by way of example and in terms of the embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A notebook computer, comprising:
   a first machinery comprising a display;
   a first latch disposed on an edge of the first machinery;
   a second machinery having one side pivotally connected to the first machinery, and the other side formed with at least one latching hole, when the first machinery and the second machinery are closed relatively to each other, the latching hole corresponds to a position of the first latch, so that the first latch is inserted into the latching hole;
   a slider, comprising:
      a body slidably disposed in the second machinery along a first moving path;
      a second latch, disposed on the body and suiting to latch the first latch or unlatch an interference with the first latch; and a first elastic element having one end connected to the body, and the other end suiting to press the first latch;

a second elastic element having one end connected to the slider, and the other end connected to an inner wall of the second machinery; and a push element slidably disposed in the second machinery along a second moving path and suiting to push the first elastic element, wherein when the push element pushes the first elastic element, the first elastic element no longer presses the first latch, and the second elastic element acts upon the slider to unlatch the interference between the second latch and the first latch.

2. The notebook computer according to claim 1, wherein the first elastic element comprises an elastic arm and a stopper block, the push element suits to push the stopper block, the elastic arm has a first end and a second end, the first end of the elastic arm is connected to the body, the stopper block has a first side connected to the second end, and a second side facing the second latch.

3. The notebook computer according to claim 2, wherein one surface of the stopper block facing the second latch has a first inclined surface, one surface of the second latch facing the stopper block has a second inclined surface, and the first latch suits to act upon the first inclined surface and the second inclined surface to actuate the slider.

4. The notebook computer according to claim 2, wherein the first latch has a fastening slot, and a dimension of the fastening slot is greater than or equal to a dimension of the second latch, so that the slider latches the first latch.

5. The notebook computer according to claim 2, wherein the second machinery has a through hole, the push element is disposed in the through hole, and the slider has an extension, which is connected to the stopper block and extends to the second moving path.

6. The notebook computer according to claim 5, wherein the push element rests against the extension to push the extension, and pushes the stopper block outside the first moving path.

7. The notebook computer according to claim 1, wherein an elastic constant of the second elastic element along the first moving path is smaller than an elastic constant of the first elastic element along the first moving path.

8. The notebook computer according to claim 1, wherein when the first latch is inserted into the latching hole, the first latch suits to act upon the other end of the first elastic element, so that the first elastic element and the second elastic element deform along the first moving path.

9. The notebook computer according to claim 8, wherein when the first latch acts upon the other end of the first elastic element, the first elastic element generates a first compressive deformation state along the first moving path, and the second elastic element generates a first tensile deformation state along the first moving path.

10. The notebook computer according to claim 9, wherein when the first latch latches the second latch, the first elastic element is converted from the first compressive deformation state into a second compressive deformation state, the second elastic element is converted from the first tensile deformation state into a second tensile deformation state, a compressive deformation extent of the first compressive deformation state is greater than a compressive deformation extent of the second compressive deformation state, and a tensile deformation extent of the first tensile deformation state is smaller than a tensile deformation extent of the second tensile deformation state.

* * * * *